United States Patent [19]

Siverling

[11] 4,400,747
[45] Aug. 23, 1983

[54] SERVO SYSTEM FOR DATA STORAGE APPARATUS

[75] Inventor: Michael M. Siverling, Rochester, Minn.

[73] Assignee: International Business Machines Corporation, Armonk, N.Y.

[21] Appl. No.: 277,764

[22] Filed: Jun. 26, 1981

[51] Int. Cl.$^3$ ............................................. G11B 21/10
[52] U.S. Cl. ..................................................... 360/77
[58] Field of Search ..................................... 360/77-78, 360/135, 44, 48, 49

[56] References Cited

U.S. PATENT DOCUMENTS

| | | | |
|---|---|---|---|
| 3,175,205 | 3/1965 | Auyang | 360/77 |
| 3,593,333 | 7/1971 | Oswald | 360/77 |
| 3,691,543 | 9/1972 | Mueller | 360/78 |
| 4,101,942 | 7/1978 | Jacques | 360/77 |
| 4,208,679 | 6/1980 | Hertrich | 360/77 |
| 4,297,737 | 10/1981 | Andresen et al. | 360/77 |
| 4,322,760 | 3/1982 | Hardwick | 360/77 |

Primary Examiner—Alfred H. Eddleman
Attorney, Agent, or Firm—Robert W. Lahtinen

[57] ABSTRACT

The servo system includes the use of servo signals of four types such that each group of four adjoining servo tracks identifies the center line of a data track of interest and presents unique signals from the respective four servo tracks. The analog value of the signals are stored and sensed to provide a substantially linear position error signal over a three-track wide region. By using variable gain with respect to the analog signals, compensation for the variance between data head width and track pitch, and a quadrature servo portion, linearity can be achieved. In addition, since the substantially linear region is three tracks wide and the position error signal does not become ambiguous over a width of four tracks, a one-track seek can be accomplished using an error signal rather than a seek.

10 Claims, 17 Drawing Figures

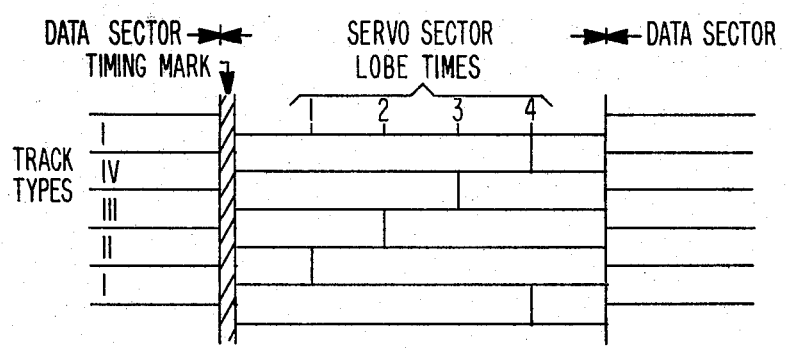
FIG. IA
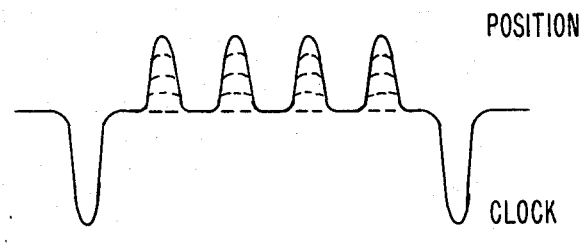
FIG. IB

| DATA TRACK TYPE WHICH BECOMES CENTER OF LINEAR REGION | 1ST LOBE TIME | 2ND LOBE TIME | 3RD LOBE TIME | 4TH LOBE TIME |
|---|---|---|---|---|
| I | GATE C | GATE D | GATE A | GATE B |
| II | GATE B | GATE C | GATE D | GATE A |
| III | GATE A | GATE B | GATE C | GATE D |
| IV | GATE D | GATE A | GATE B | GATE C |

SERVO SYSTEM FOR DATA STORAGE APPARATUS

BACKGROUND OF THE INVENTION

This invention relates to servo systems and more particularly to a system for correcting lateral deviations of a transducer from a desired path with respect to a recording medium.

The track to track spacing of disk files has been continually reduced as a function of track following technology improvements. The physical width of the capture area, or region where the position error signal is a linear function of head displacement from track center, has been shrinking as the number of tracks per inch has been increasing. Hard file memories are being required to possess faster and faster track accessing. Furthermore, less servo information is being made available to the track access hardware, particularly when sector servo schemes are employed which only yield servo information for a small portion of time per sector and once each sector.

Sector servo relates to the fact that the disk may be informationally divided up into sectors (much as one would cut a pie). Each sector is further divided into a servo information subsector and a data information subsector. Positional information is only available while the magnetic transducers are over a servo information subsector. Super synchronous access refers to an access where tracks are crossed at a rate greater than the rate of servo position information occurrence. The implication of this is that position information may not be available at the time each track is crossed. Therefore, the access mechanism must assume track crossings based on ballistics and Newton's laws where there is not real time verification of track crossings.

Two facts, first, that files are trying to move faster during access than they have heretofore and second, that there is less space alloted on the disk for the track follow and access hardware to receive current, accurate information, would mandate larger track capture areas where the position error signal is a linear function of the head's displacement from the track centerline.

SUMMARY OF THE INVENTION

This invention allows an area that is three tracks wide to produce a position error signal that is a linear function of head distance from the selected track centerline. The invention thereby allows a large linear capture region, even though the number of tracks per inch is increased.

The invention yields a linear output position for an area that is plus or minus one and one-half tracks from the position that is decoded as the center of interest. During an access, the expected position of the transducers is encoded as the center of the area of interest. As the servo position information area is passed, the actual position of the transducers relative to the expected position is available, assuming the actual position is within the three track wide area of interest. The number of tracks you can cross between servo information points is limited only by the ability to be within one and one-half tracks of the expected position at the succeeding servo information point. The position plus or minus one and one-half tracks is a very loose tolerance and thus allows a very fast super synchronous sector servo accessing.

The invention yields easily accessible real velocity information for both access and track follow loop stability. The derivative of the position signal is the velocity during dedicated servo track follow mode. In sector servo mode, the difference between successive sampled positions will readily yield velocity by analog means using position change divided by the time between samples where the time between samples is a constant. It involves storing the position and creating a voltage or current proportional to the change in position at the next position sample time.

The difference between successive sampled positions will yield velocity for accessing, assuming an analog to digital converter and digital computation of the velocity relying on position change between samples divided by the time between samples as the basis of computation.

The magnetic transducers or heads must be over one and one-half tracks off track before serious errors in the position error signal amplitude relative to the physical head displacement to track center occur. The heads must be two tracks off the desired track before the position error signal would be ambiguous with regard to the direction the head is displaced from track center. The invention thus provides a high degree of safety for sector servo systems. In a sector servo system, the track follow mechanism has no information coming in between its sample times. The system can be mislead or misinformed if the head is sufficiently displaced between samples to be positioned over a similar, but different track before the next sample time occurs.

But unlike present systems, in the case of the invention, the next similar track is four tracks away. It would be undesirable to read or write with the file if the heads were a tenth of a track off-track center. Therefore, one can set a threshold whereby if the head is over a reasonable amount off track, safety circuits can flag the problem. It would take an unrealistic impact to push the head to a similar position on track and four tracks away in one sample time.

The invention makes a completely digital track access system viable. The tolerances required to be able to get real time position information at servo information time are very loose. The result is that a digital system with only a five bit analog to digital converter and only a two bit digital to analog converter can easily do the accessing. Either a microprocessor or digital hardware can do the digital task.

The invention can do single track seeks without leaving its linear region. By simple change of decode, the head finds itself off center, but in the linear region and pulls itself on track to the new location. This is possible because the linear region is several tracks wide. The arm does not require any "kick" in the direction of the desired track and never has to enter the true seek mode. The result is that a single track seek can be very fast.

The invention in its simplest form, is the use of a servo pattern that is repeated only on a multiple of four tracks. Files up to this time have used patterns that repeat every second track. The systems prior to this invention rely on counting odd and even tracks to do their access. They have schemes that require the reading of an absolute track identification as a backup to the track counting scheme for system reliability. The capture area is related to the track width, and track widths have progressively shrunk in size. The invention provides the necessary means to enlarge the "airport" so that faster and less precision accessing can achieve track capture. Prior schemes have used quadrature patterns for added linearity of output, but they continue to have basically odd and even tracks. Quadrature patterns can be used with the invention also, but they are not the invention. The invention is to use a pattern which has a timing mark or signal sequence followed by four distinct position elements where relative magnitude of the signal from the position element is proportional to the percentage of a magnetic transducer (head) that covers each of the four distinct tracks. The invention allows the linear range of the defined signal to encompass three tracks or plus and minus one and one-half tracks from the track center without ambiguity. The invention allows this range for a single demodulation gating sequence. The gating to the demodulater does not have to change for the entire three track linear range.

BRIEF DESCRIPTION OF THE DRAWING

FIG. 1a schematically shows the servo track portions associated with the sector servo error signal generating scheme of the present invention in conjunction with the four types of adjoining data tracks.

FIG. 1b shows the positions of lobe or bit-time signals and the associated clock or timing mark pulses.

DETAILED DESCRIPTION

In a typical tri bit magnetic disk storage servo scheme as practiced in the art, the servo sector position information portion contains a sequence of a clock bit followed by two position bits. Since alternate tracks have signals at odd and even position bits, the signal sequence of half amplitude position bits is indicative that the transducer is positioned at the interface of two servo tracks and therefore is properly centered on the associated data track which is is one-half track displaced from the servo tracks.

As schematically illustrated in FIGS. 1a and 1b, the present invention utilizes a clock or timing mark position followed by four bit positions. The clock or timing mark provides a unique signal sequence that is decoded to indicate that the servo bit position information follows immediately thereafter. Each of the servo tracks has one position bit with the position bit sequenced in a recurring manner such that any sequence of four adjacent tracks have the respective position bits occurring at a unique bit position or lobe time. When a transducer is positioned on a data track centerline and consequently on the interface of two servo tracks, half strength signals will be encountered at two of the four bit position or lobe times. Thus, whenever two equal strength signals are encountered during the four bit or lobe times, the transducer is centered on a data track. Furthermore, the combination of bit positions at which the signals occur identify which of four adjacent tracks is being followed. As shown in FIG. 1a if equal amplitude signals occur at lobe times 1 and 4, the transducer is aligned with a data track type I. If the lobe time with equal amplitude signals are 1 and 2, 2 and 3 or 3 and 4, then the transducer is respectively aligned with the center line of tracks type II, III or IV.

Figure 2:
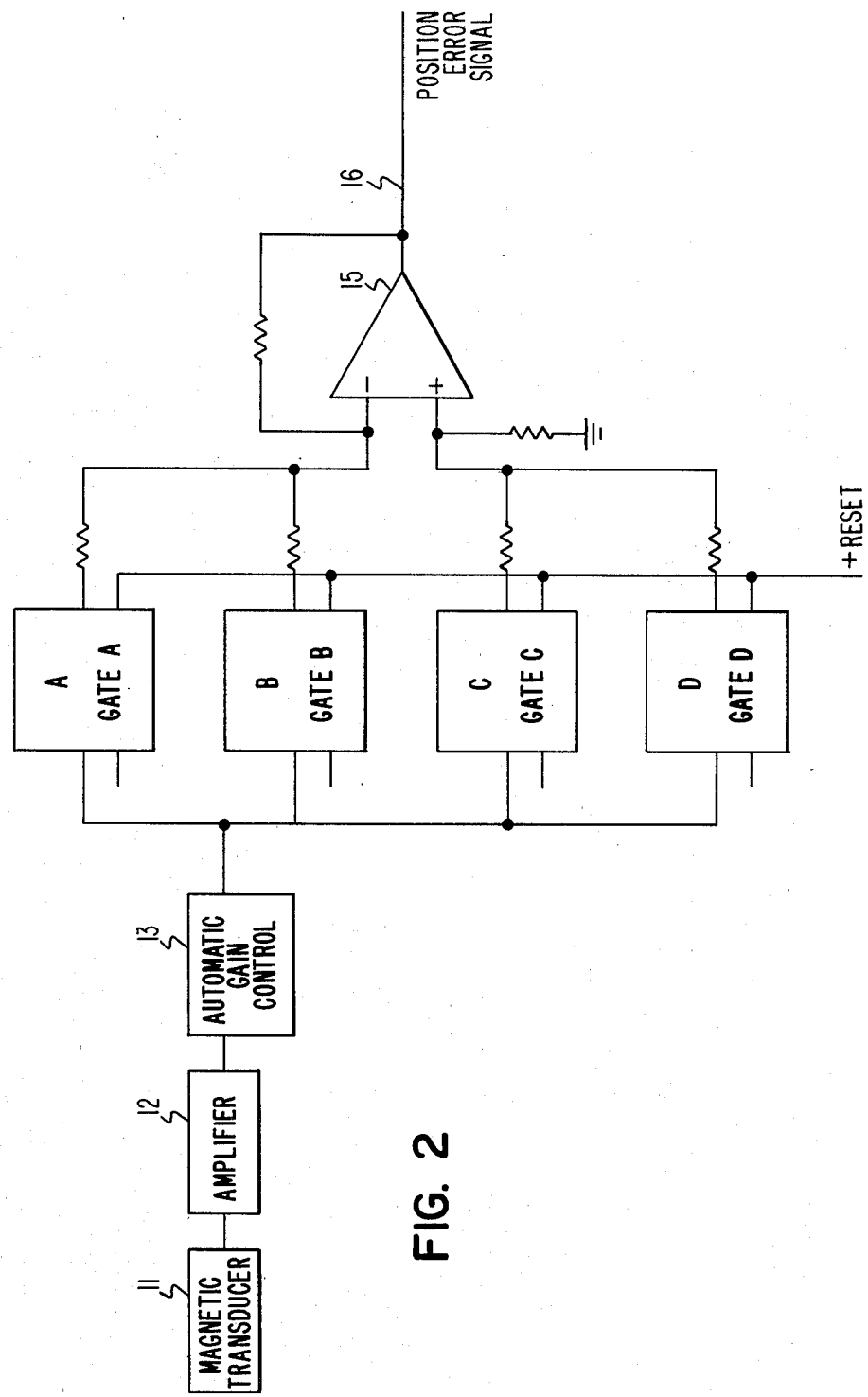
FIG. 2 illustrates the logic of the transducer, amplitude storage circuits, comparator and some of the accompanying intermediate devices.

In addition to such track following and track identification information, a position signal can be generated using the circuit of FIG. 2. The signal from magnetic transducer 11 passes serially through amplifier 12 and automatic gain control 13 to each of four gating circuits A, B, C and D. The gating circuits A, B, C and D are selectively gated to differential amplifier 15 in accordance with the selected track type to produce a position-error signal on line 16. The gating occurs such that positioning the transducer on the centerline of the desired track produces equal amplitude signals at lobe times gated to circuits B and C to produce a zero output from differential amplifier 15 on line 16. The gating sequences are shown in the table in FIG. 3 for the track type and lobe times illustrated in FIG. 1a.

The gating circuits of FIG. 2 provide outputs wherein the gain from circuits B and C are equal, but respectively subtracted or added by differential amplifier 15. The outputs from circuits A and D are of the same gain, are respectively subtracted and added by differential amplifier 15 and have gains greater than the gain of circuits B and C. If the gain of circuits A and D is three times the gain of circuits B and C, a substantially linear output over a three-track pitch distance can be obtained as described hereafter.

Figure 4A:
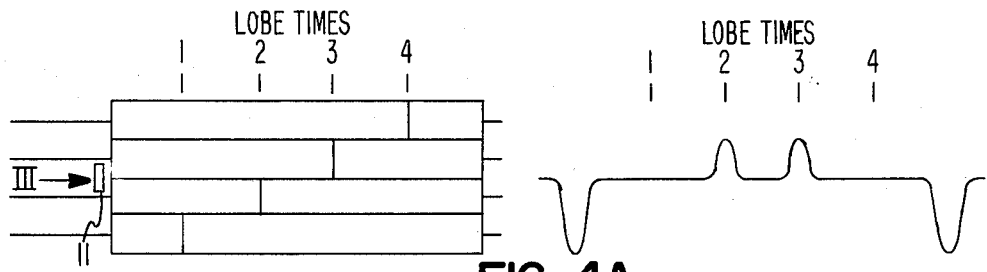
FIGS. 4a through 4f are schematic showings similar to FIGS. 1a and 1b, showing the signals generated by various transducer orientations for a data track type III center of interest.

Referring to FIG. 4 which illustrates a type III track as the center of interest, FIG. 4a shows the on-track location where equal amplitude signals are produced which when gated to the gating circuits B and C produce a zero output on OR position error signal on line 16. This indicates an on-track position for which no error correction is required.

Figure 4B:
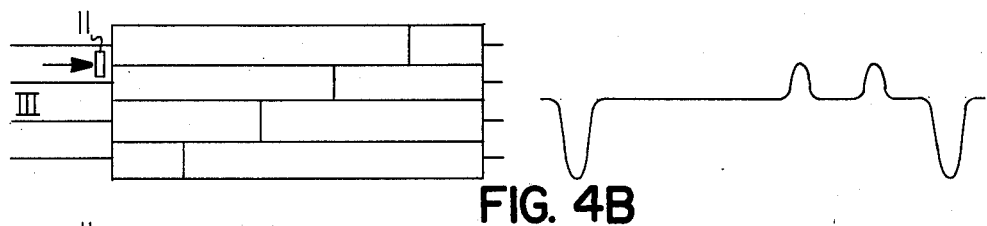

In FIG. 4b the transducer 11 is located a full track pitch away from the desired track type III position, producing equal amplitude signal at lobe times 3 and 4. The gating circuit C produces a signal during lobe time 3 and gating circuit D produces a signal of three times the gain at lobe time 4. Both signals are additive by the differential amplifier 15 to produce an error signal on line 16 indicating that the transducer should be displaced downward from the position shown in FIG. 4b.

Figure 4C:
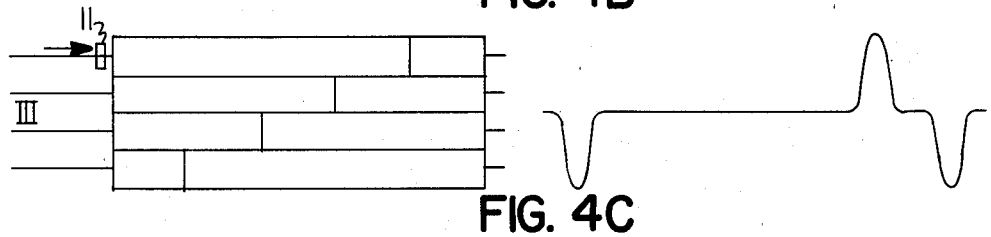

FIG. 4c is similar to FIG. 4b, but shows transducer 11 displaced one and one-half tracks from the desired centerline position of track type 3. In this position the transducer produces a maximum amplitude output at lobe time 4 that produces a three times gain signal from the gating circuit D to differential amplifier 15 and consequently a maximum amplitude position error signal on line 16 indicating a downward correction as viewed in FIG. 4c.

Figure 4D:
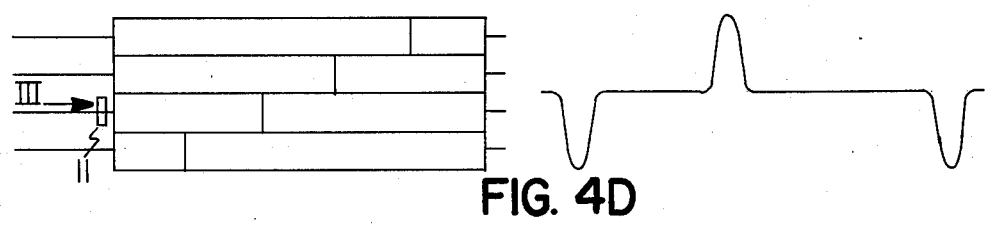
Figure 4E:
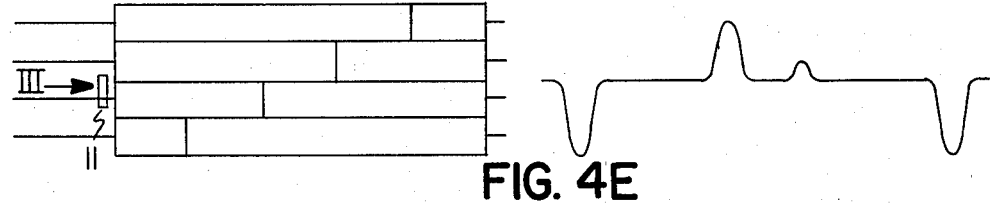

FIG. 4d shows the transducer displaced one-half track downward from the desired position on the centerline of track type 3. The single signal at lobe time 2 gated to gating circuit B produces an output from differential amplifier 15 on line 16. FIG. 4e shows a slight deviation from the desired track centerline which produces signals in lobe times 2 and 3 wherein the error signal generated on line 16 from differential amplifier 15 is the net value of the greater subtractive signal gated from circuit B at lobe 2 time and the lesser additive signal gated from circuit C at lobe 3 time.

Figures 3, 6:
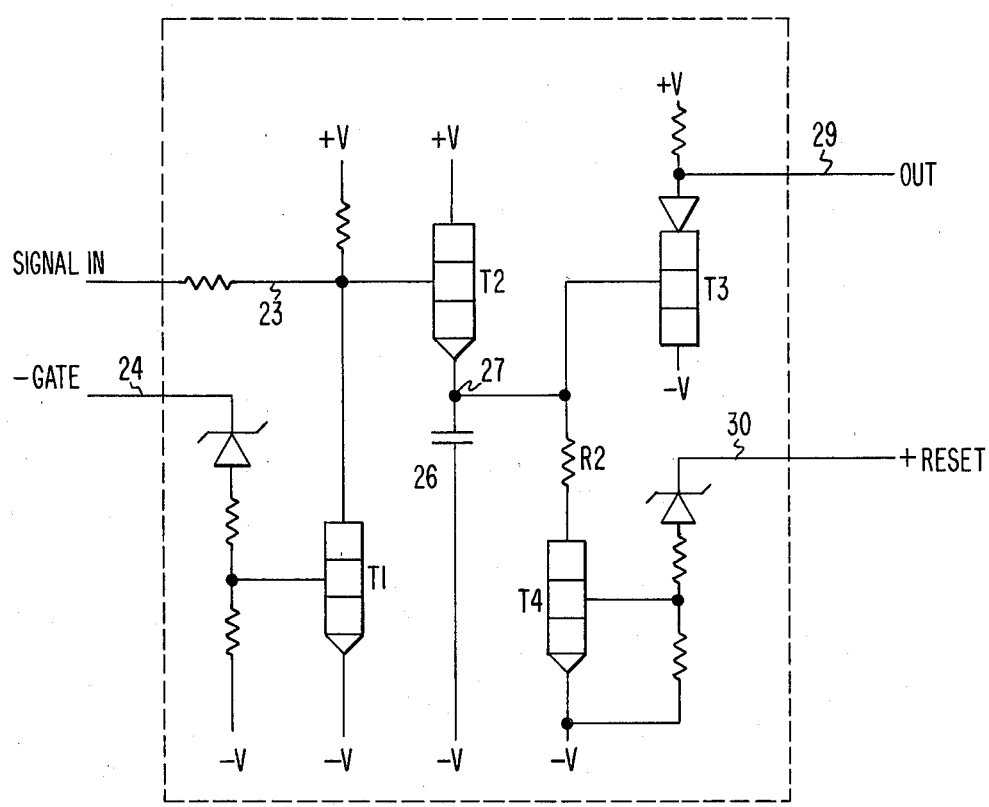
FIG. 3 is a table showing the gating sequence for the track types and signal positions of FIG. 1a in conjunction with the gates and amplitude storage of FIG. 2.
FIG. 6 shows a typical circuit for amplitude storage of the servo lobe time signals.
Figure 4F:
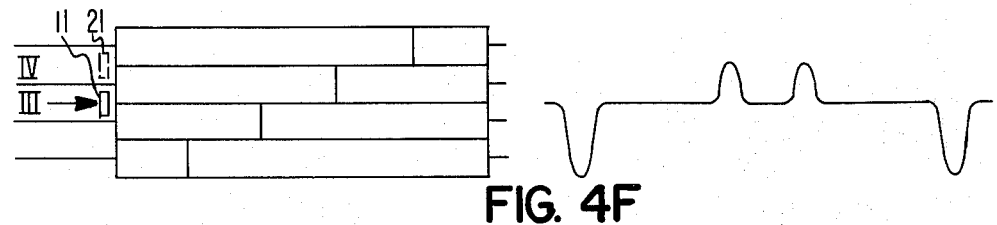

FIG. 4f indicates the use of a position error signal on line 16 to implement a one-track seek to move from the track type III where transducer 11 is shown to the adjoining track type IV where the transducer is shown, dotted and identified as 21. The transducer is properly aligned on track type III and producing signals of equal amplitude at lobe times 2 and 3. With track type 3 as the track of interest, no position error signal would be produced on line 16 as the signals from the gating circuits B and C are equal. However, to move transducer 11 from track type III to the adjoining track type IV the gating sequence is changed to a track IV gating sequence as shown in the table of FIG. 3. Lobe time 2 and 3 signals are now gated to gating circuits A and B respectively. This results in an output on line 16 which is negative indicative of an upward corrective move. Thus the single track access is achieved solely through the use of the position error signal since a one-track error is well within the linear region of the position error-signal.

Figure 5:
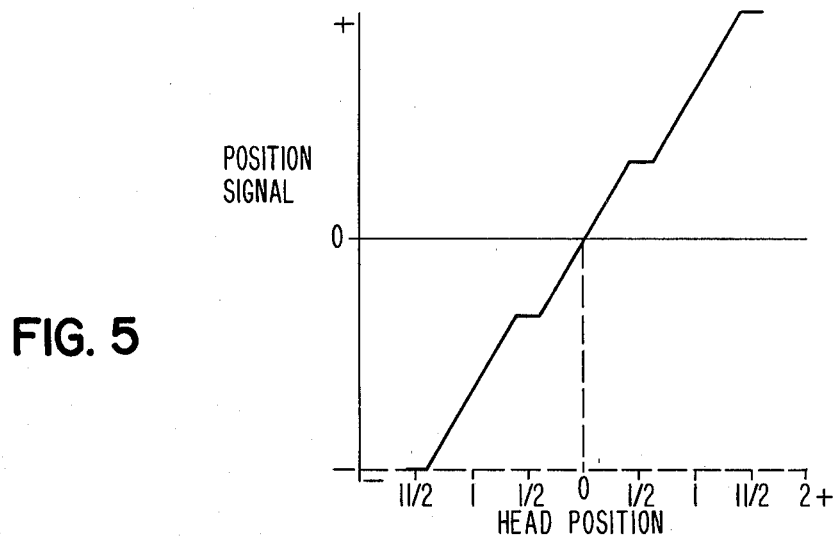
FIG. 5 is a curve showing the position at various deviations of the transducer from the data track center line.

FIG. 5 shows the position error signal as a function of the transducer displacement from the track centerline. The curve shows the substantially linear relationship.

The constant signal horizontal curve portions are introduced by the fact that the data transducer has a width less than the full-track pitch. The curve illustrates a condition wherein the transducer width is 80 percent as large as the distance between adjacent track centerlines. Beyond the linear region of approximately one and one-half track pitches, the position-error signal continues to be indicative of the direction of the correction to the proper track centerline until a full two-track pitch deviation is achieved in either direction.

FIG. 6 is illustrative of a typical circuit to perform the functions of the lobe detector, gating circuits A through D. The signal on line 23 is held negative as long as a positive signal exists on gate line 24 and transistor T1 remains on. When a minusgate signal occurs on line 24, transistor T1 turns off permitting transistor T2 to turn on and charge the capacitance 26 to bring the voltage at node 27 to a level representative of the amplitude of the input signal on line 23. The emitter-follower transistor T3 enables the analog output on line 29. The positive signal on plus-reset line 30 turns on transistor 4 to permit capacitor 26 to discharge through limiting resistor R2 and prepare the detector device for the next cycle.

FIG. 5 shows a plot of the position-error signal. The horizontal axis is the head to track position wherein the data-track centerline is aligned with the centerline of the head when the curve indicates a zero-position error signal. The vertical axis is the position-error signal in volts. It will be noted that a discontinuity occurs in the curve where there is no alteration of the position error signal or change in the transfer function as the data transducer, which is narrower than the track pitch, and the servo track moves transversely to the track wholly within a single-servo track. This nonlinearity in most applications causes no difficulty, but through some modification of the embodiment described above, such nonlinearity may be partially or wholly removed.

Figure 7:
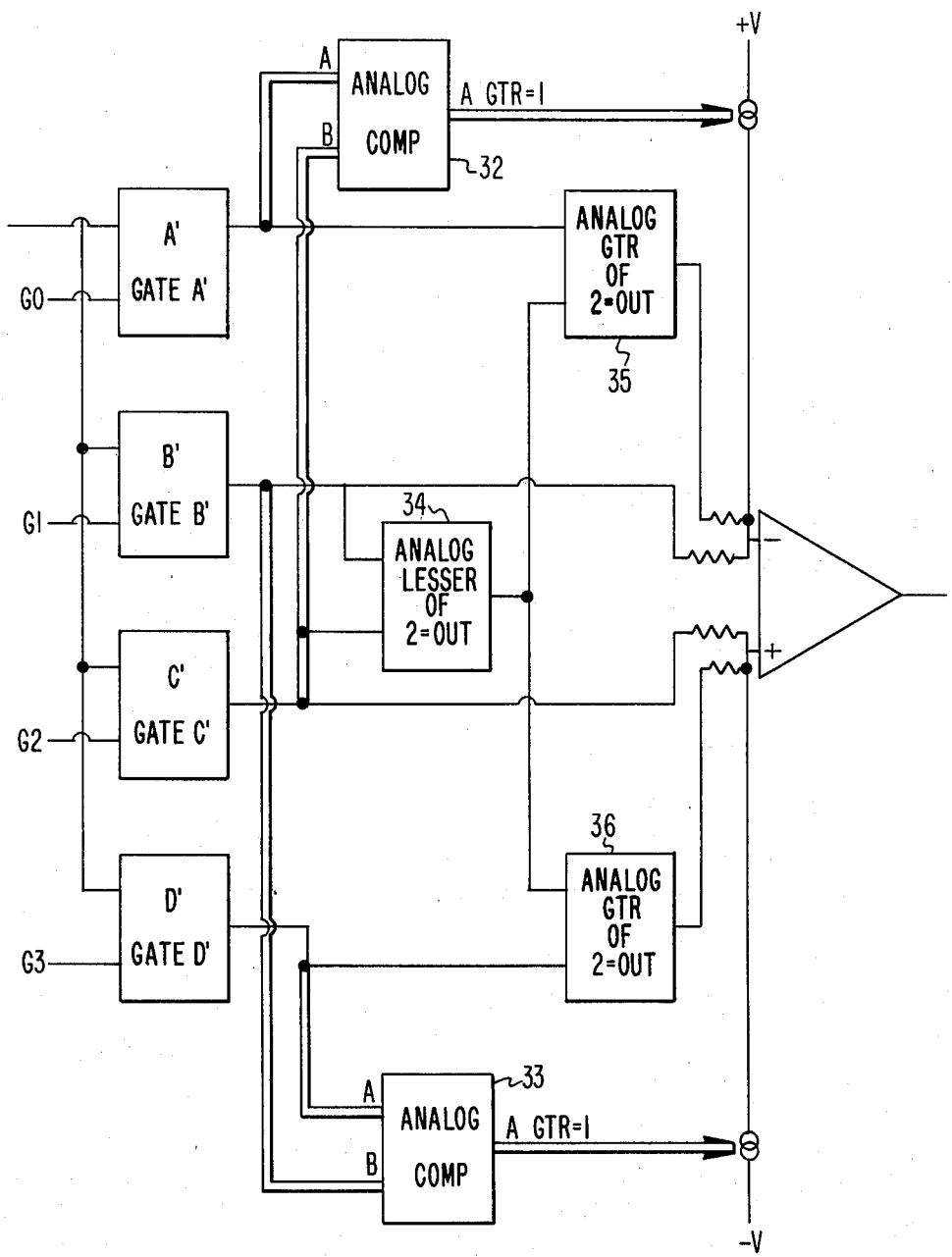
FIG. 7 is a circuit similar to FIG. 2 with the addition of circuits to impart corrective signals and suppress noise in track-follow mode.

The circuit illustrated in FIG. 7 is similar to the circuit of FIG. 2, but includes analog compare circuits 32, 33 and analog circuits 34, 35 and 36 used for the suppression of noise. The lobe detection or gating circuits A', B', C', D' and the differential amplifier 15' correspond to the respective circuits of FIG. 2. Assuming the data head or transducer to have a width equivalent to 80 percent of the track pitch or the distance between adjoining track centerlines, a 0.2 track pitch variation in a position-error signal occurs prior to the generation of the transfer function generated by the servo tracks adjacent the servo tracks which define the centerline of interest.

Figure 8:
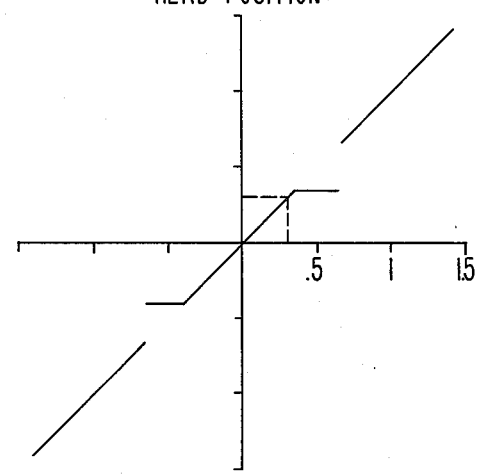
FIG. 8 is similar to FIG. 5 and includes the supplemental signals imparted to align the linear curve portons.

Analog-compare circuit 32 has inputs from gating circuits A' and C'. When A' is greater than C', the analog-compare circuit 32 has an output which increases the voltage to the differential amplifier 15' by a magnitude equivalent to 0.2 track-pitch displacement. In a like manner analog-compare circuit 33 has inputs from gating circuits B' and D'. When D' is greater than B' the analog-compare circuit 33 has an output which increases the voltage signal to the differential amplifier 15' by a magnitude equivalent to 0.2 track pitch displacement. Since the signals from B' and C' have terminated prior to any signal from D' or A' respectively, the increase of the output signal and the displacement of the curve occur as soon as any signal is received from gating circuits A' or D'. The resulting output is shown in FIG. 8 wherein a disk continuity exists where the transfer function is interrupted but the linear portions are aligned to provide in those regions a continuous linear correspondence between the signal magnitude and the displacement from the track centerline.

In FIG. 7 the analog circuit 34 gates out the lesser of the two analog inputs from the gating circuits B' and C'. When the transducer is functioning in the B' and C' transfer area, the lesser value will be gated out of analog circuit 34. Since no transducer initiated signal is originating from gating circuits A' and D', the value from the analog circuit 34 will be greater and will be gated through analog circuits 35 and 36. The outputs of analog circuits 35 and 36 will be equal and have no effect upon the output of differential amplifier 15', but this does serve to suppress any noise or extraneous signal that might occur at the output of gating circuits A' and D'. When the transducer is functioning in the region of the A', B' transfer function, analog circuit 34 will gate out the zero or low input of gating circuit C', while analog circuit 36 will gate out the greater value of the output of C' and D' to thereby suppress one of the outputs C' and D'. In line manner one of the outputs of A' and B' are suppressed by analog circuits 34 and 35 when the transducer is operating in the region of the C', C' transfer function.

Figure 10:
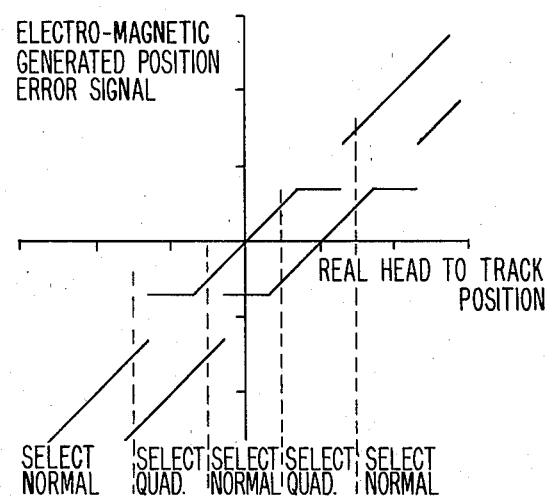
FIG. 10 is a view similar to the graphic representation of FIG. 8, but includes the signal generated by the quadrature portion of FIG. 9.
Figure 9:
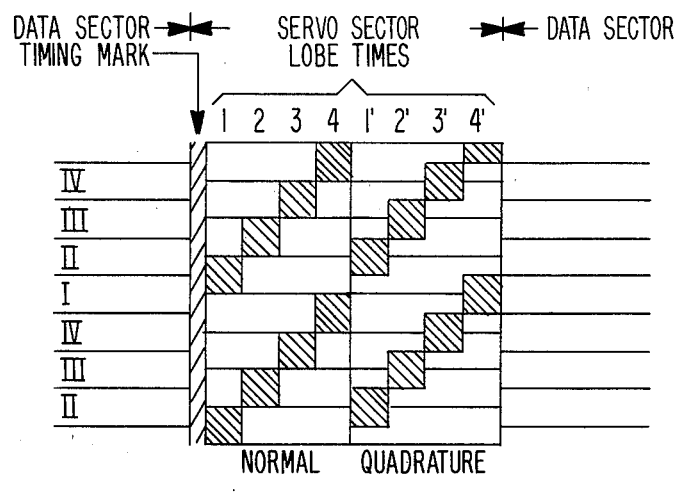
FIG. 9 is a schematic partial view of the servo track portion of an alternative embodiment including quadrature.

To provide a continuous linear output, the servo information is recorded as illustrated in FIG. 9 with an initial timing mark or unique signal sequence followed by a regular servo pattern as in FIG. 1a and an additional quadrature servo portion. The quadrature portion has the same bit signals and windows as the regular servo pattern but is displaced one-half track pitch such that the centerline of the quadrature track portions are aligned with the data track centerlines. The function of the circuitry of FIG. 7 is duplicated, and such second decode function is utilized to decode the quadrature servo portion signals. The output of the two gating and decode circuits provide the curves shown in FIG. 10. The normal servo portion produces the curve at the left wherein the position error signal curve passes through the zero deviation position (or alignment with the data track centerline) when the amplitude error signal value is zero volts. The quadrature servo portion is displaced 0.5 track pitch when a zero position error signal occurs.

Figure 11:
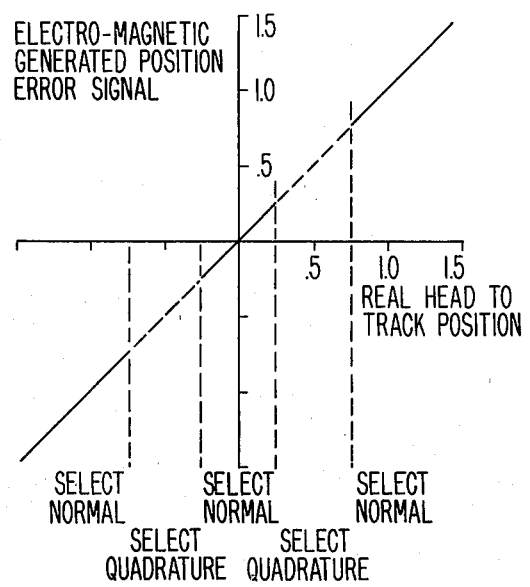
FIG. 11 is the resultant curve from combining the normal and electrically displaced quadrature signal portions shown in FIG. 10.

It will be observed that the portion of the regular servo portion curve which is discontinuous is vertically aligned with a linear portion of the quadrature portion servo curve. By selecting the output from the normal servo portion and the quadrature servo portion as noted horizontally along FIG. 10, a linearly changing position error signal can be obtained and by adding to the quadrature curve a voltage equivalent to a half track pitch displacement, the curves are made to coincide with the resulting selected position error signal values being both linear and continuous as shown in FIG. 11.

A further refinement of the concept would be to divide the normal servo portion and the quadrature servo portion each into a sequence of four windows with each track having a series of transitions within one of the windows rather than a single bit transition.

The invention allows a new type of accessing philosophy to be used. Instead of counting track crossings as other schemes do, the expected position at the next servo pattern time is set up in the gating sequence and at servo pattern times, the position-error signal is the difference between where the head is and where it was expected to be.

If it is expected that five tracks will be crossed between the time the last servo pattern was sensed and the time the next servo pattern is encountered, the accuracy of that prediction need only be plus or minus one and one-half out of five tracks or plus or minus 30 percent for the heads to be within the linear range of the position error signal based on the expected track as track center. This accuracy is achieved using either digital or microprocessor accuracies. If the head is released anywhere within one and one-half tracks of the track on which it was desired to land, the track-follow mode circuitry can bring the head on track by making use of the plus or minus one and one-half track linear region to bring the head on track under precise control. The result is a system that can access by using prediction even when many tracks are crossed between patterns. The technique does not rely on counting track crossings or pseudo track crossings created by a voltage controlled oscillator where real track crossings might not be present in a sector servo mode. Thus, multiple tracks can be crossed per sector during access and a handoff to track-follow mode can be accomplished, all with the digital or microprocessor accuracy without the need for pseudo information to be created to keep things going until the next real information is available. If a gating sequence such as A, C, B, D is used, the position output would still yield track crossing. The technique of this invention can be used in a track-crossing count base system and then when the gating occurs changed to a gating sequence, the track capture area being three tracks wide. The wide capture area could be used even in a dedicated servo system to allow extremely fast access in track settle times.

Either a predictor or track crossing counter type of access system could make use of the three track wide linear settle system. Sampled velocity is adequate to stabilize both the predictor-access mode and the track follow mode. During access the velocity can be computed digitally using the relative positions during two pattern samples and the fact that the time between samples is a constant as inputs to the computation. In track follow mode, the analog equivalent can be formed by creating a signal which is the difference between the previously held position sample and the present position sample. Stabilized in this way, the total system is homogenous, super synchronous in access mode, digital in access mode, relying only on real information, and is fast in access mode. This system with its side linear region would require extreme external forces to knock the magnetic transducer (head) out of its linear region and get it lost. This is true even if the system is used in a very low sample rate sector-servo configuration.

Having thus described my invention, what is claimed as new and desired to be secured by Letters Patent is:

1. In a data storage device of the type wherein a data track is aligned by locating a transducer with respect to the interface between adjoining servo tracks, a servo system for positioning a transducer means relative to a given data track comprising:
   a sequence of at least four radially adjacent servo track portions;
   a unique signal recorded in each of said four servo track portions;
   analog sensing means including said transducer means for sensing the magnitude of signals received from each of said four servo track portions;
   first circuit means for imparting a first signal strength value to the signals of the two of said servo track portions whose interface locates said data track and a second higher signal strength value to the signals of the servo track portions adjoining said two of said servo track portions, said signals from servo track portions at one side of said interface having one polarity and the signals from said servo track portions at the side opposite said one side having a polarity the opposite of said one polarity; and
   second circuit means connected to the output of said first circuit means for determining the magnitude and polarity of the modified signal received from said first circuit means, whereby the magnitude of displacement and the direction of displacement of said transducer means from said interface is ascertained.

2. The data storage device of claim 1 wherein said analog sensing means comprises transducer means; analog amplitude storage means; and selective gating means for gating the signals from said four adjacent servo track portions to said amplitude storage means in accordance with one of the four types of data tracks identified by said four adjacent servo track portions.

3. The data storage device of claim 2 wherein said second higher signal strength is approximately three times the amplitude of said first signal strength.

4. A transducer positioning servo system for use in a random access disk memory which includes positioning means for moving the transducer from track to track in response to commands and corrective position error signals and a disk subdivided into sectors with data sector portions alternated circumferentially with servo sector portions and wherein the track portions within said servo sector portions are offset a half-track pitch from the tracks in said data sector portions;

a sequence of radially adjacent servo tracks in each servo sector with each servo track having a timing mark signal followed by a sequence of four signal locations and a magnetic transition occurring in one of said four signal locations;

said magnetic transitions occurring in said signal locations such that a sequence of four radially adjoining servo tracks has magnetic transitions at unique signal locations; and detection means connected to receive the magnetic transitions from said four signal locations and generate said position error signal substantially linearly representative of the deviation of the transducer from the data track center line identified by said sequence of four radially adjoining servo tracks.

5. The transducer positioning servo system of claim 4 wherein said detection means comprises:

analog amplitude detector circuit means connected to receive selectively gated transitions from said four signal locations;

means for applying selective gain to the output of said amplitude detector means; and compare circuit means for receiving the amplified output of said amplitude detector circuit means and generating an analog position error signal.

6. The transducer positioning servo system of claim 5 wherein each of the sequence of four signal locations comprises a window and the magnetic transitions comprises a sequence of transitions within one of said windows.

7. The transducer positioning system of claim 6 wherein a first pair of said four radially adjoining servo tracks define a data track center line and a second pair of said four radially adjacent servo tracks respectively immediately radially adjoin said first pair of servo tracks and further comprising:

sensing means for determining when a signal is received from one of said second pair of four radially adjoining servo tracks; and first signal means for imparting an additional signal increment to said position error signal when said sensing means indicates receipt of a signal from one of said second pair of said four adjoining servo tracks.

8. The transducer positioning means of claim 7 further comprising a quadrature servo portion following said sequence of four signal locations;

said quadrature portion being divided into a second group of four signal locations with transitions occurring in said second group of signal locations such that in a sequence of four radially adjacent tracks each have signals at unique locations within said second group of signal locations;

a second detection means connected to receive signals from said second group of four signal locations;

means for selectively gating the position error signal from said first detection means or from said second detection means, and second signal means for imparting an additional signal to said second detection means output having an amplitude to compensate for displacement of said quadrature servo track portion, whereby the composite signal selected from said detector means and said second detector means provides a substantially continuous linear output over one and one-half track widths in each radial direction from the center line of the data track of interest.

9. In a data storage device of the type wherein a data track is aligned by locating a transducer with respect to the interface between adjoining servo tracks, a servo system for positioning the transducer relative to a given data track comprising:

a first sequence of at least four radially adjacent servo track portions;

a unique signal recorded in each of said four servo track portions of said first sequence;

a quadrature servo portion following said first sequence of four radially adjacent servo track portions, said quadrature portion being divided into a second sequence of four radially adjacent servo track portions with each having a unique signal within said record sequence;

analog sensing means including said transducer for sensing the signal magnitude received from said servo track portions;

first circuit means for imparting a first signal strength to the value of the signals of a first pair of servo track portions of said first sequence that form the interface defining the centerline of the data track and a second, higher signal strength to the value of the signals of the servo track portions of said first sequence forming a second pair of servo track portions that immediately respectively adjoin the first pair of servo track portions of said first sequence, second circuit means for imparting a third signal strength to the values of the signals of the central pair of the second sequence of servo track portions and, a fourth, higher signal strength to the pair of said second sequence of servo track portions disposed at opposite radial sides of said central pair; and selectively gating said first and second circuit means to produce a substantially linear position error signal output over a three track range of transducer position.

10. The transducer positioning means of claim 9 wherein said second circuit means third and fourth signal strengths include a signal component of magnitude and polarity to compensate for the radial offset of the interface between said second sequence central pair of track portions from the interface of said first circuit first pair of track portions.

* * * * *